United States Patent [19]

Hayashi et al.

[11] Patent Number: 4,937,310

[45] Date of Patent: Jun. 26, 1990

[54] POLYESTER RESIN EXHIBITING OPTICAL ANISOTROPY IN MOLTEN STATE AND COMPOSITION THEREOF

[75] Inventors: Noriyuki Hayashi, Fuji; Kenji Hijikata, Mishima, both of Japan

[73] Assignee: Polyplastics Co., Ltd., Japan

[21] Appl. No.: 335,438

[22] Filed: Apr. 10, 1989

[30] Foreign Application Priority Data

Apr. 13, 1988 [JP] Japan .................................. 63-90892

[51] Int. Cl.$^5$ .............................................. C08G 63/02
[52] U.S. Cl. .................................... 528/193; 524/601; 528/176; 528/190
[58] Field of Search ....................... 528/176, 190, 193; 524/601

[56] References Cited

U.S. PATENT DOCUMENTS

| | | | |
|---|---|---|---|
| 3,778,410 | 12/1973 | Kuhfuss et al. | 528/176 |
| 3,975,487 | 8/1976 | Cottis et al | 528/176 |
| 4,161,470 | 7/1979 | Calundann | 528/190 |
| 4,318,841 | 3/1982 | East et al. | 524/605 |
| 4,370,466 | 1/1983 | Siemionko | 528/190 |
| 4,552,974 | 6/1985 | Calundann et al. | 524/605 |
| 4,684,712 | 8/1987 | Ueno et al. | 528/190 |

FOREIGN PATENT DOCUMENTS 0070658  1/1983  European Pat. Off. .

Primary Examiner—Harold D. Anderson
Assistant Examiner—T. Mosley
Attorney, Agent, or Firm—Burns, Doane, Swecker & Mathis

[57] ABSTRACT

A polyester resin comprises 35 to 90 mole percent of the unit (I), 0.5 to 20 mole percent of the unit (II), 0.5 to 45 mole percent of the unit (III) and 0.5 to 45 mole percent of the unit (IV), exhibiting the anisotropy in its molten state. It may further comprise 0.5 to 45 mole percent of the unit (V). The composition is here presented, comprising the polyester resin as defined above and up to 95 percent by weight of an inorganic filler.

7 Claims, No Drawings

POLYESTER RESIN EXHIBITING OPTICAL ANISOTROPY IN MOLTEN STATE AND COMPOSITION THEREOF

This invention relates to a polyester resin exhibiting optical anisotropy in a molten state and having excellent heat resistance, processability and mechanical properties and its composition.

PRIOR ART

In recent years, various proposals have been made of a polymer (a liquid crystal polymer exhibiting optical anisotropy in a molten state as a thermoplastic resin having a combination of heat resistance with processability. Representative examples thereof include those disclosed in (1) Japanese Patent Laid-Open No. 72393/1974, (2) Japanese Patent Laid-Open No. 43223/1975, and (3) Japanese Patent Laid-Open No. 77691/1979. Each of these liquid crystal polymers contains a rigid monomer introduced into the skeleton thereof to form a liquid crystal structure, thereby realizing a high strength and excellent processability.

However, the following factors should be taken into consideration in order to further improve the heat resistance and processability. Specifically, since a thermoplastic resin is usually molded at 350° C. at the highest and a special molding machine should be used when the molding is conducted at a temperature above 350° C., the molding temperature is preferably 350° C. or below from the viewpoint of versatility in shaping and economy of heat source.

Further, there is an ever-increasing tendency of the thermoplastic resin to be used under severe conditions, and a particular importance is placed on the reliability of the mechanical properties of the resin at a high temperature. Therefore, it is desired that the resin have a thermal deformation temperature, serving as an indication of the heat resistance, of at least 150° C., preferably 200° C.

With respect to the thermoplastic resin, the two above-described properties are contradictory to each other, so that it is very difficult to simultaneously accomplish a lowering in the melting point or fluidizing point and an increase in the thermal deformation temperature.

Although the above-described conventional liquid crystal polymer (1) satisfies the requirement with respect to the thermal deformation temperature, i.e., 200° C. or above, it does not satisfy the requirement with respect to the molding temperature, i.e., 350° C. or below. Although the above-described conventional liquid crystal polymers (2) and (3) satisfy the requirement with respect to the molding temperature, i.e., 350° C. or below, the thermal deformation temperatures of liquid crystal polymers (2) and (3) are 100° C. or below and 180° C., respectively, and therefore are below the above-described desirable thermal deformation temperature range.

SUMMARY OF THE INVENTION

In view of the above-described circumstances, the present inventors have made extensive and intensive studies with a view to developing a thermoplastic resin which can simultaneously satisfy the properties contradictory to each other, i.e., heat resistance and high processability, and can exhibit excellent mechanical properties even in severe environments and, as a result, have found that a polyester having particular constituent units can solve the above-described problems and offer a good balance among the properties, which has led to the completion of the present invention.

Specifically, the present invention relates to a polyester resin exhibiting optical anisotropy in a molten state, characterized by comprising constituent units represented by the following formulae (I) to (IV) as indispensable components in amounts of 35 to 90% by mole, 0.5 to 20% by mole, 0.5 to 45% by mole, and 0.5 to 45% by mole, respectively, and another polyester resin exhibiting optical anisotropy in a molten state, characterized by comprising said constituent units (I) to (IV) and further a constituent unit represented by the following formula (V):

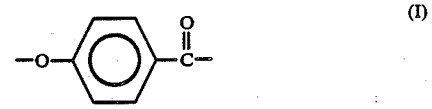

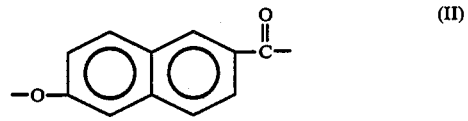

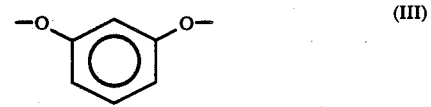

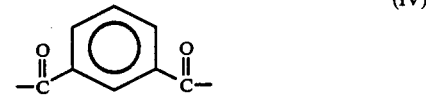

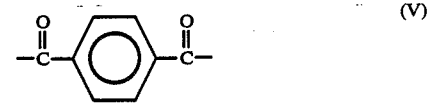

The invention provides, in other words, a polyester resin which comprises 35 to 90 mole percent of the unit (I), 0.5 to 20 mole percent of the unit (II), 0.5 to 45 mole percent of the unit (III) and 0.5 to 45 mole percent of the unit (IV), exhibiting the anisotropy in its molten state. It may further comprise 0.5 to 45 mole percent of the unit (V). The composition is here presented, comprising the polyester resin as defined above and up to 95 percent by weight of an inorganic filler.

The present invention enables a polymer having a good balance between high processability and heat resistance to be provided through a combination of the above-described particular constituent units in particular proportions, particularly with a low content of constituent (II).

Specific examples of a compound for providing polymer constituent unit (I) include p-hydroxybenzoic acid and its derivatives. Examples of the derivatives include acylated benzoic acids such as acetoxybenzoic acid, benzoates such as methyl hydroxybenzoate, ethyl hydroxybenzoate, butyl hydroxybenzoate and phenyl hydroxybenzoate, and acyl chlorides such as hydroxybenzoyl chloride.

Constituent unit (I) is used in an amount of 35 to 90% by mole, preferably 50 to 90% by mole based on the total amount of the constituent units.

Specific examples of a compound for providing constituent (II) include 2-hydroxy-6-naphthoic acid and its derivatives. Examples of the derivatives include acylated naphthoic acids such as 2-acetoxy-6-naphthoic acid, naphthoates such as methyl 2-hydroxy-6-naphthoate, ethyl 2-hydroxy-6-naphthoate, butyl 2-hydroxy-6-naphthoate, and phenyl 2-hydroxy-6-naphthoate, and acyl chlorides such as 2-hydroxy-6-naphthoyl chloride.

Constituent unit (II) is used in an amount of 0.5 to 20% by mole, preferably 1 to 15% by mole based on the total amount of the constituent units. The incorporation of constituent unit (II) even in a small amount has a great effect on the characteristics of the polymer.

Specific examples of a compound for providing constituent unit (III) include resorcinol and its derivatives. Examples of the derivative include esters such as diacetoxyresorcinol.

Constituent unit (III) is used in an amount of 0.5. to 45%, preferably 2 to 25% by mole based on the total amount of the constituent units.

Specific examples of a compound for providing constituent unit (IV) include isophthalic acid and its derivatives. Examples of the derivatives include isophthalates such as methyl isophthalate, ethyl isophthalate and phenyl isophthalate and acyl chlorides such as isophthaloyl chloride.

Constituent unit (IV) is used in an amount of 0.5 to 45% by mole, preferably 2 to 15% by mole based on the total amount of the constituent units.

Specific examples of a compound for providing constituent unit (V) include terephthalic acid and its derivatives. Examples of the derivatives include terephthalates such as methyl terephthalate, ethyl terephthalate and phenyl terephthalate, and acyl chlorides such as terephthaloyl chloride.

Constituent unit (V) is used in an amount of 0.5 to 45% by mole, preferably 2 to 15% by mole based on the total amount of the constituent units.

The polymer of the present invention is prepared from these compounds by polymerization such as direct polymerization or transesterification. Melt polymerization and slurry polymerization are usually employed for the polymerization.

The above-described polymerization is conducted in the presence of various catalysts, and representative examples of the catalyst include dialkyltin oxide, diaryltin oxide, titanium dioxide, alkoxytitanium silicate, titanium alcoholate, alkali metal carboxylate and alkaline earth metal carboxylate, and Lewis acid such as $BF_3$.

The catalyst is used in an amount of usually about 0.001 to 1% by weight, particularly preferably 0.01 to 0.2% by weight based on the total weight of the monomers.

The polymer prepared by the above-described polymerization process can be further heated in an inert gas to bring about solid polymerization to thereby increase the molecular weight.

That the polymer is a liquid crystal polymer exhibiting optical anisotropy in a molten state is essential for the polyester resin of the present invention to have a combination of heat resistance with high processability.

The properties of the anisotropic melt phase may be examined by a customary polariscopic method using crossed Nicol prisms. More particularly, the presence of the anisotropic melt phase can be confirmed by observing a sample placed on a Leitz hot stage in a nitrogen atmosphere at a magnification of 40 under a Leitz polarization microscope. The above-described polymer is optically anisotropic. Namely, when it is placed between crossed Nicol prisms, it transmits light. If the sample is optically anisotropic, the polarized light can be transmitted, even when it is in a static state.

In the present invention, the liquid crystallinity and melting point (liquid crystal development temperature) may be used as an indication of the processability. The flowability of a polymer in a molten state is deeply concerned in whether or not the polymer exhibits liquid crystallinity. The polyester of the present invention should exhibit liquid crystallinity in a molten state.

A nematic liquid crystalline polymer brings about a remarkable lowering in the viscosity at a temperature above the melting point. Therefore, in this case, an indication of the processability is to exhibit liquid crystallinity at or above the melting point thereof. For this reason, the melting point (liquid crystal development temperature) should be preferably 350° C. or below from the viewpoint of heating capability of general molding machines.

In the present invention, the thermal deformation temperature, rigidity at a high temperature, etc. may be used as an indication of the heat resistance. With the consideration of the applications for the resin, it is necessary to satisfy the following heat resistance requirements: (1) the material has soldering heat resistance sufficient for withstanding the step of soldering in the field of electricity or the like; and (2) the material can be continuously used under stress at a high temperature. The above item (2) can be evaluated by using the thermal deformation temperature, and although the performance of the resin per se correlates with the above-described item (1), it can be said that when the thermal deformation temperature of the resin is 200° C. or above, the resin has very excellent heat resistance when used as a material for parts associated with heat accumulators and heat sources.

Various inorganic and organic fillers in the fibrous, particulate or flaky form may be incorporated in the polyester of the present invention depending upon the purpose of the use.

Examples of the fibrous filler include inorganic fibrous materials such as glass fiber, asbestos fiber, silica fiber, silica/alumina fiber, alumina fiber, zirconia fiber, boron nitride fiber, silicon nitride fiber, boron fiber, potassium titanate fiber, and fibrous materials of metals such as stainless steel, aluminum, titanium, copper, and brass. An especially representative fibrous filler is glass fiber. It is also possible to use high-melting organic fibrous materials such as polyamide, fluororesin, polyester resin, or acrylic resin.

Examples of the particulate filler include carbon black, graphite, silica, quartz powder, glass beads, milled glass fiber, glass balloons, glass powder, silicates such as calcium silicate, aluminum silicate, kaolin, talc, clay, diatomaceous earth and wollastonite, metallic oxides such as iron oxide, titanium oxide, zinc oxide, antimony trioxide and alumina, metal carbonates such as calcium carbonate and magnesium carbonate, metal sulfates such as calcium sulfate and barium sulfate, and other various powdery metals such as ferrite, silicon carbide, silicon nitride and boron nitride.

Examples of the flaky inorganic material include mica, glass flake, and various metallic foils.

Examples of the organic filler include heat-resistant high-strength synthetic fibers such as organic polyester fiber, liquid crystal polymer fiber, aromatic polyamide fiber, and polyimide fiber.

These inorganic and organic fillers may be used alone or in a combination of two or more of them. Combined use of the fibrous filler and the particulate or flaky filler is preferable for the resin to have a combination of mechanical strengths with dimensional accuracy, electrical properties, etc. The inorganic filler is incorporated in an amount of 95% by weight or less, preferably 1 to 80% by weight based on the total amount of the composition.

It is preferred that, if necessary, these fillers be used in combination with binders or surface treatments.

Further, the polyester of the present invention may contain other thermoplastic resins as an auxiliary additive in such an amount as will not spoil the purpose of the present invention.

The thermoplastic resin used in this case include polyolefins such as polyethylene and polypropylene, aromatic polyesters comprising either an aromatic dicarboxylic acid and a diol, such as polyethylene terephthalate and polybutylene terephthalate, or a hydroxy carboxylic acid, polyacetal (homopolymer and copolymer), polystyrene, polyvinyl chloride, polyamide, polycarbonate, ABS, polyphenylene oxide, polyphenylene sulfide, and fluororesin These thermoplastic resins may be used in the form of a mixture of two or more of them.

EFFECT OF THE INVENTION

The organic polyester and its composition according to the present invention comprising particular constituent units and exhibiting optical anisotropy in a molten state can exhibit excellent performance, is flowable at a processing temperature of 350° C. or below, can be subjected to usual injection molding, extrusion molding and compression molding, can be worked into various three-dimensional moldings, fibers, films, etc. and particularly can exhibit suitable flowability for injection molding. Further, the organic polyester and its composition according to the present invention can not only maintain the mechanical strengths even in a high temperature state because the thermal deformation temperature is 200° C. or above but also has soldering heat resistance, which renders the organic polyester and its composition suitable for use in various applications where heat resistance is required. Accordingly, the polyester resin of the present invention exhibits an improved balance between the melt processability temperature and the heat resistance of a molded article formed from the same.

EXAMPLES

The present invention will now be described with reference to the following Examples which should not be construed as limiting the present invention.

The measuring methods used in the present invention will first be described.

(1) Measurement of liquid crystallinity:

The liquid crystallinity of the prepared resin was confirmed with a Leitz polarization microscope. Specifically, a sample placed on a Leitz hot stage was observed in a nitrogen atmosphere at a mangification of 40. When the sample transmitted a light beam when placed between crossed nicols, the sample was regarded as having a liquid crystal structure.

(2) Measurement of melting point:

The melting point was measured with a differential scanning calorimeter.

(3) Measurement of soldering heat resistance:

The soldering heat resistance was measured by immersing a specimen of 1 mm cut out from a press sheet in a soldering bath of 260° C. for 30 sec and observing the surface appearance. When any abnormal phenomenon, such as blistering, wrinkling, cracking, or deformation, was observed on the surface, the sample was evaluated as having poor soldering heat resistance (X), while when the surface was free from such abnormal phenomena, the sample was evaluated as having good soldering heat resistance (0).

(4) Measurement of torsional rigidity:

The rigidity at 250° C. was measured with a Rheometer manufactured by Rheometrics, Inc. with respect to a tensile specimen cut out from a 1 mm-thick press sheet The thermal deformation in the step of soldering or the like can be evaluated by the rigidity in a high-temperature atmosphere. When the sample has a rigidity of at least $10^4$ dyn/cm$^2$ at 250 to 260° C., it can be regarded as having excellent thermal deformation resistance.

(5) Measurement of thermal deformation temperature:

The thermal deformation temperature was measured according to ASTM-D 648 (load: 18.6 kg/cm$^2$)

Example 1

A reactor equipped with an agitator, a nitrogen inlet, and a distilling tube was charged with 88% by mole of p-acetoxybenzoic acid, 2% by mole of 2,6-acetoxynaphthoic acid, 5% by mole of diacetoxyresorcinol, 5% by mole of isophthalic acid, and potassium acetate in an amount of 0.05% by weight based on the total amount of the charge. The mixture was heated to raise the temperature to 260° C. over a period of 1 hr in a nitrogen gas stream. The mixture was then heated at 260° to 300° C. for 2 hr while distilling formed acetic acid from the reactor, and then at 300° to 320° C. for 1 hr and at 320° to 350° C. for 1 hr. Formed acetic acid was distilled in vacuo. Nitrogen was introduced into the reaction mixture to cool it to room temperature. The resultant polymer exhibited optical anisotropy at about 310° C. or above when observed under a polarization hot stage microscope. The melting temperature, thermal deformation temperature, and rigidity were measured respectively by the above-described methods. The results are shown in Table 1.

Examples 2 to 4

Polymerization was conducted in substantially the same manner as that of Example 1 by making use of the monomers in proportions shown in Table 1. The resultant polymers were subjected to measurements by the same method as that of Example 1. The results are shown in Table 1.

Comparative Examples 1 to 3

Polymerization was conducted in the same manner as that of Example 1 by making use of the monomers in proportions shown in Table 1, and the resultant polymers were subjected to measurements by the same method as that of Example 1. The results are shown in Table 1.

Example 5

100 parts by weight of the polymer used in Example 2 was mixed with 20 parts by weight of glass fibers to prepare a composition, and the composition was subjected to measurements in the same manner as that of Example 1. The results are shown in Table 1. T,0200

We claim:

1. A polyester resin which exhibits an anisotropic melt phase and an improved balance between the melt processability temperature and the heat resistance of a molded article formed from the same consisting essentially of 35 to 90 mole percent of the unit (I), 0.5 to 20 mole percent of the unit (II), 0.5 to 45 mole percent of the unit (III), 0.5 to 45 mole percent of the unit (IV), and 0.5 to 45 mole percent of unit (V), wherein:

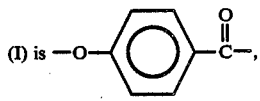

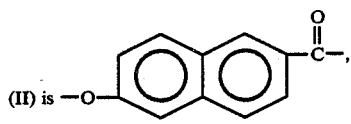

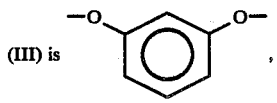

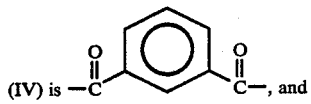

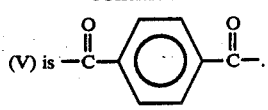

2. A polyester composition which comprises the polyester resin as defined in claim 1 and up to 95 percent by weight of an inorganic filler.

3. A polyester resin exhibiting optical anisotropy in the molten state according to claim 1 which includes 1 to 80 percent by weight of an inorganic filler.

4. A polyester resin exhibiting optical anisotropy in the molten state according to claim 3 wherein said inorganic filler is a combination of fibrous and particulate fillers.

5. A polyester resin exhibiting optical anisotropy in the molten state according to claim 2 wherein said inorganic filler is a combination of fibrous and particulate fillers.

6. A polyester resin exhibiting optical anisotropy in the molten state according to claim 1 wherein said resin is capable of being melt processed at a temperature of 350° C. or below and is capable of forming articles which exhibit a thermal deformation temperature of at least 200° C.

7. A polyester resin exhibiting optical anisotropy in the molten state according to claim 1 wherein said resin consists essentially of 50 to 90 mole percent of unit (I), 1 to 15 mole percent of unit (II), 2 to 25 mole percent of unit (III), 2 to 15 mole percent of unit (IV), and 2 to 15 mole percent of unit (V).

* * * * *